(12) United States Patent
Cheng et al.

(10) Patent No.: US 11,956,122 B2
(45) Date of Patent: *Apr. 9, 2024

(54) VEHICLE TO EVERYTHING (V2X) CENTRALIZED PREDICTIVE QUALITY OF SERVICE (QOS)

(71) Applicant: QUALCOMM Incorporated, San Diego, CA (US)

(72) Inventors: Hong Cheng, Basking Ridge, NJ (US); Michaela Vanderveen, Tracy, CA (US); Junyi Li, Fairless Hills, PA (US); Shailesh Patil, San Diego, CA (US); Sudhir Kumar Baghel, Pleasanton, CA (US); Zhibin Wu, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,739

(22) Filed: May 10, 2022

(65) Prior Publication Data
US 2022/0345365 A1  Oct. 27, 2022

Related U.S. Application Data

(63) Continuation of application No. 16/378,688, filed on Apr. 9, 2019, now Pat. No. 11,329,874.

(Continued)

(51) Int. Cl.
*H04L 41/0816* (2022.01)
*H04W 4/40* (2018.01)
(Continued)

(52) U.S. Cl.
CPC ........... *H04L 41/0816* (2013.01); *H04W 4/40* (2018.02); *H04W 24/02* (2013.01); *H04W 64/00* (2013.01)

(58) Field of Classification Search
CPC . H04L 41/0816; H04L 43/062; H04L 41/147; H04L 67/12; H04W 4/40;
(Continued)

(56) References Cited

U.S. PATENT DOCUMENTS 11,329,874 B2   5/2022  Cheng et al.
2016/0295624 A1  10/2016  Novlan et al.
(Continued)

FOREIGN PATENT DOCUMENTS

CN   106341839 A   1/2017
CN   107710795 A   2/2018
(Continued)

OTHER PUBLICATIONS

International Preliminary Report on Patentability—PCT/US2019/026770, The International Bureau of WIPO—Geneva, Switzerland, dated Oct. 22, 2020.

(Continued)

*Primary Examiner* — Kwang B Yao
*Assistant Examiner* — Syed M Bokhari
(74) *Attorney, Agent, or Firm* — Patterson & Sheridan, L.L.P.

(57) ABSTRACT

Certain aspects of the present disclosure are generally directed to techniques for selecting a configuration for communication using vehicle to everything (V2X) type communication protocol. Certain aspects provide a method for wireless communication by a user-equipment (UE). The method generally includes determining one or more parameters corresponding to quality of service (QoS) information for communication of data using a V2X communication protocol, reporting the one or more parameters by transmitting a first message, receiving a second message indicating configuration information corresponding to the communication of the data using the V2X communication protocol, and (Continued)

communication the data based on the configuration information.

30 Claims, 11 Drawing Sheets

Related U.S. Application Data

(60) Provisional application No. 62/656,807, filed on Apr. 12, 2018.

(51) Int. Cl.
*H04W 24/02* (2009.01)
*H04W 64/00* (2009.01)

(58) Field of Classification Search
CPC . H04W 24/02; H04W 64/00; H04W 28/0226; H04W 28/0268; H04W 76/14
USPC ......................................................... 370/252
See application file for complete search history.

(56) References Cited

U.S. PATENT DOCUMENTS

| | | | |
|---|---|---|---|
| 2017/0332213 A1 | 11/2017 | Xu et al. | |
| 2018/0035276 A1* | 2/2018 | Kang | H04W 72/02 |
| 2018/0124656 A1 | 5/2018 | Park et al. | |
| 2018/0139593 A1* | 5/2018 | Chun | H04W 4/46 |
| 2018/0146398 A1* | 5/2018 | Kim | H04W 80/02 |
| 2018/0262924 A1* | 9/2018 | Dao | H04W 24/08 |
| 2019/0029057 A1* | 1/2019 | Pan | H04W 76/10 |
| 2019/0089498 A1* | 3/2019 | Pelletier | H04L 5/005 |
| 2019/0207778 A1* | 7/2019 | Qiao | H04W 76/10 |
| 2019/0313279 A1* | 10/2019 | Li | H04W 72/12 |
| 2019/0394786 A1* | 12/2019 | Parron | H04L 5/0032 |
| 2020/0037126 A1* | 1/2020 | Lee | H04W 4/40 |
| 2020/0296733 A1 | 9/2020 | Liu | |

FOREIGN PATENT DOCUMENTS

| | | | | |
|---|---|---|---|---|
| EP | 3244677 A1 | 11/2017 | | |
| WO | 2016200184 A1 | 12/2016 | | |
| WO | 2017206168 A1 | 12/2017 | | |
| WO | WO-2017206168 A1 * | 12/2017 | ........ | H04W 28/0263 |
| WO | 2018015612 A1 | 1/2018 | | |

OTHER PUBLICATIONS

International Search Report and Written Opinion—PCT/US2019/026770—ISA/EPO—dated Jul. 15, 2019.
Qualcomm Incorporated: "QoS for V2X Communication over PC5", 3GPP TSG-RAN WG2 Meeting #95bis, R2-166736, Kaohsuing, Oct. 10-14, 2016, 3 Pages.

\* cited by examiner

1300

| V2X Service ID (PSID) | PPPP/PPPR map or vehicle 5QI map preferred or used | Transmit characteristics used | Buffer status for sending (for bursts/aperiodic) | Traffic pattern / Current message generation rate (for periodic flows) |
|---|---|---|---|---|
| 0x89 | 5 | Modulation/coding=<..>, TX diversity <on/off>, Retx=2 times. | | 10 Hz |
| 0x45 | 15 | Modulation/coding=<..>, TX diversity <on/off>, Retx=off | <range of bytes or packets in queue e.g., Kbps > | |

| V2X Service ID (PSID) | PPPP/PPPR map or vehicle 5QI map recommended | Transmit characteristics | Location where this is valid | Time period of applicability | Recommended message generation rate (for periodic flows) |
|---|---|---|---|---|---|
| 0x89 | 5 | Modulation/coding=<..>, TX diversity <on/off>, Retx=2 times. | Ellipse or polygon <GNSS coords or differential> | Current to <Time-of-day> | 5 Hz |
| 0x45 | 15 | Modulation/coding=<..>, TX diversity <on/off>, Retx=off | Ellipse or polygon <GNSS coords or differential | Current to <Time-of-day> | N/A (burst) |

FIG. 13B

VEHICLE TO EVERYTHING (V2X) CENTRALIZED PREDICTIVE QUALITY OF SERVICE (QOS)

CROSS-REFERENCE TO RELATED APPLICATIONS

This application is a continuation of U.S. patent application Ser. No. 16/378,688, filed Apr. 9, 2019, which claims the benefit of U.S. Provisional Patent Application Ser. No. 62/656,807, filed Apr. 12, 2018, which are expressly incorporated herein by reference in their entireties.

FIELD OF THE DISCLOSURE

Certain aspects of the present disclosure generally relate to wireless communications and, more particularly, to methods and apparatus for configuring communication in vehicle-to-everything (V2X) communications systems.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. Vehicle to everything communications seek to enable vehicles to communicate with one another to provide a host of services, including vehicle to vehicle communications (V2V), vehicle to infrastructure (V2I) communications, vehicle to grid (V2G) communications and vehicle to people (V2P) communications.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure are generally directed to vehicle techniques for selecting a configuration for vehicle to everything (V2X) type communications.

Certain aspects provide a method for wireless communication by a user-equipment (UE). The method generally includes determining one or more parameters corresponding to quality of service (QoS) information for communication of data using a V2X communication protocol, reporting the one or more parameters by transmitting a first message, receiving a second message indicating configuration information corresponding to the communication of the data using the V2X communication protocol, and communicating the data based on the configuration information.

Certain aspects provide a method for wireless communication. The method generally includes receiving, from at least one UE, a first message reporting one or more parameters corresponding to QoS information for communication of data by the UE using a V2X communication protocol, determining configuration information corresponding to the communication of the data by the UE based on the one or more parameters, and transmitting a second message indicating the configuration information.

Certain aspects provide an apparatus for wireless communication. The apparatus generally includes at least one processor configured to determine one or more parameters corresponding to QoS information for communication of data using a V2X communication protocol, and a transceiver coupled to the at least one processor, the transceiver being configured to report the one or more parameters by transmitting a first message, receive a second message indicating configuration information corresponding to the communication of the data using the V2X communication protocol, and communicate the data based on the configuration information.

Certain aspects provide an apparatus for wireless communication. The apparatus generally includes a transceiver configured to receive, from at least one UE, a first message reporting one or more parameters corresponding to QoS information for communication of data by the UE using a V2X communication protocol, and at least one processor coupled to the transceiver, the at least one processor being configured to determine configuration information corresponding to the communication of the data by the UE based on the one or more parameters, wherein the transceiver is further configured to transmit a second message indicating the configuration information.

Certain aspects provide an apparatus for wireless communication. The apparatus generally includes means for determining one or more parameters corresponding to QoS information for communication of data using a V2X communication protocol; means for reporting the one or more parameters by transmitting a first message; means for receiving a second message indicating configuration information corresponding to the communication of the data using the V2X communication protocol; and means for communicating the data based on the configuration information.

Certain aspects provide an apparatus for wireless communication. The apparatus generally includes means for receiving, from at least one user-equipment (UE), a first message reporting one or more parameters corresponding to QoS information for communication of data by the UE using a V2X communication protocol; means for determining configuration information corresponding to the communication of the data by the UE based on the one or more parameters; and means for transmitting a second message indicating the configuration information.

Certain aspects provide a computer-readable medium having instructions stored thereon to cause an apparatus to determine one or more parameters corresponding to QoS information for communication of data using a V2X communication protocol, report the one or more parameters by transmitting a first message, receiving a second message indicating configuration information corresponding to the communication of the data using the V2X communication protocol, and communicate the data based on the configuration information.

Certain aspects provide a computer-readable medium having instructions stored thereon to cause an apparatus to receive, from at least one UE, a first message reporting one or more parameters corresponding to QoS information for communication of data by the UE using a V2X communication protocol, determine configuration information corresponding to the communication of the data by the UE based on the one or more parameters, and transmit a second message indicating the configuration information.

Certain aspects provide a UE having at least one antenna, at least one processor configured to determine one or more parameters corresponding to QoS information for communication of data using a V2X communication protocol, and a transceiver coupled to the at least one processor, the transceiver being configured to report, via the at least one antenna, the one or more parameters by transmitting a first message, receive, via the at least one antenna, a second message indicating configuration information corresponding to the communication of the data using the V2X communication protocol, and communicate, via the at least one antenna, the data based on the configuration information.

Certain aspects provide a wireless node having at least one antenna, a transceiver configured to receive, via the at least one antenna and from at least one user-equipment (UE), a first message reporting one or more parameters corresponding to quality of service (QoS) information for communication of data by the UE using a vehicle to everything (V2X) communication protocol, and at least one processor coupled to the transceiver, the at least one processor being configured to determine configuration information corresponding to the communication of the data by the UE based on the one or more parameters, wherein the transceiver is further configured to transmit, via the at least one antenna, a second message indicating the configuration information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 13A is a table indicating example parameters to be reported by a UE, in accordance with certain aspects of the present disclosure.

FIG. 13B is a table illustrating example configurations for communication communicated to a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
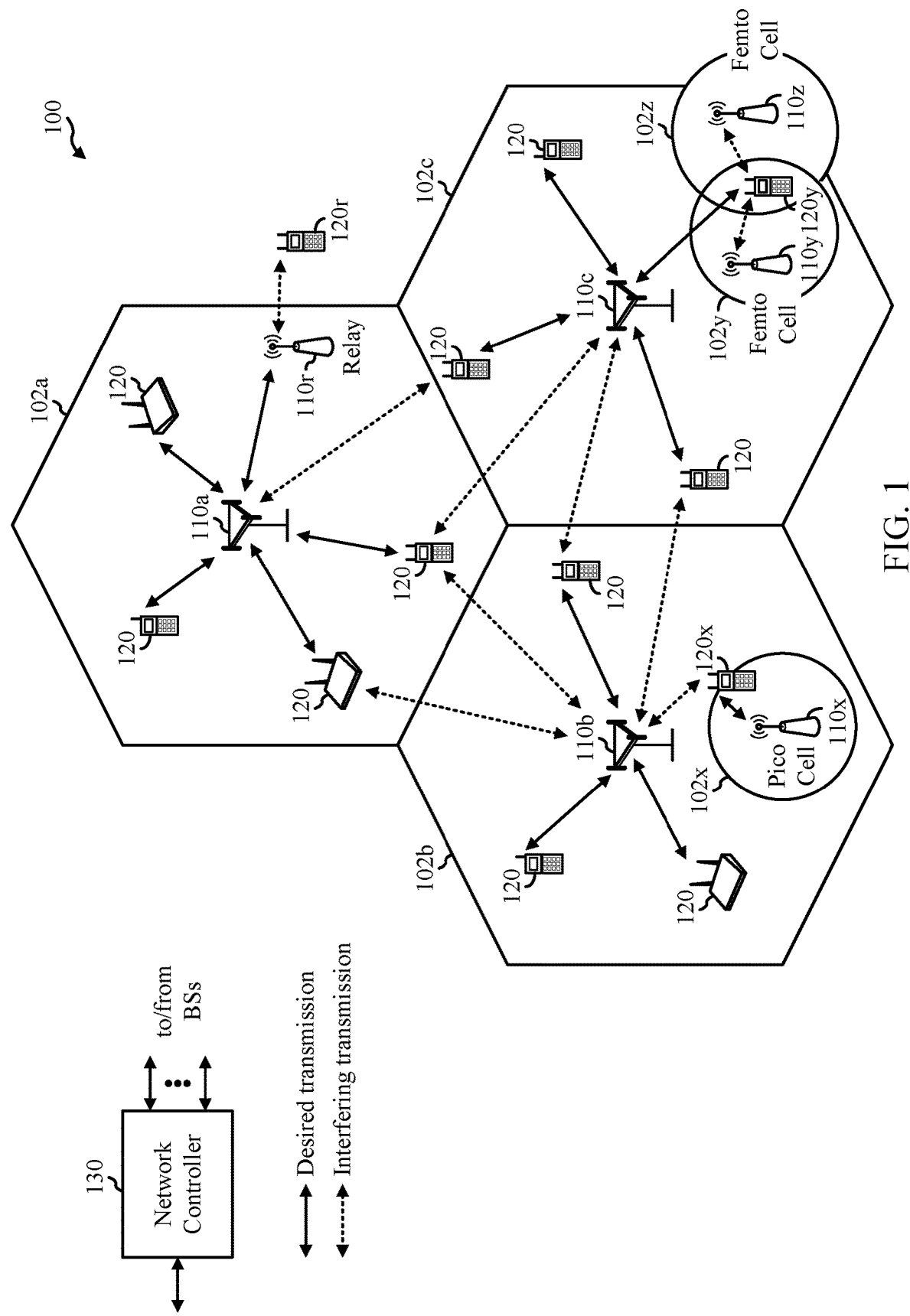
FIG. 1 is a block diagram conceptually illustrating an example telecommunications system, in accordance with certain aspects of the present disclosure.

Aspects of the present disclosure provide apparatus, methods, processing systems, and computer readable mediums for determining communication characteristics for communication using vehicle-to-everything (V2X) communication protocol. V2X has been developed as a technology to address vehicular wireless communications to enhance road safety and the driving experience.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. NR wireless communication systems may employ short uplink bursts.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
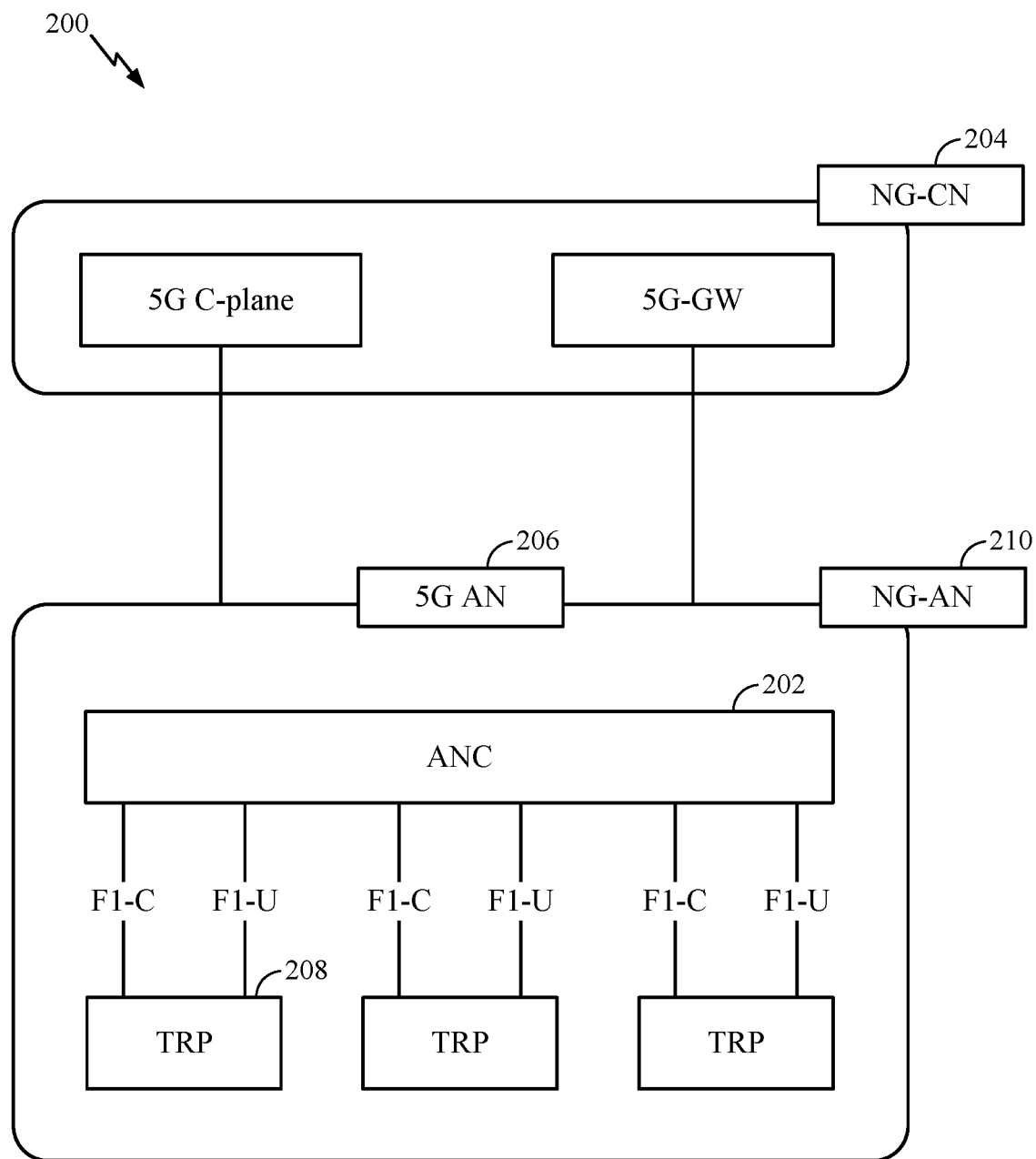
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture of the RAN 200 may be used to illustrate fronthaul definition. The logical architecture of the RAN 200 may support fronthauling solutions across different deployment types. For example, the logical architecture of the RAN 200 may be based on transmit network capabilities (e.g., bandwidth, latency, and/or jitter).

The logical architecture of the RAN 200 may share features and/or components with LTE. The next generation AN (NG-AN) 210 may support dual connectivity with NR. The NG-AN 210 may share a common fronthaul for LTE and NR.

The logical architecture of the RAN 200 may enable cooperation between and among TRPs 208. For example, cooperation may be preset within a TRP and/or across TRPs via the ANC 202. There may be no inter-TRP interface.

Logical architecture of the RAN 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
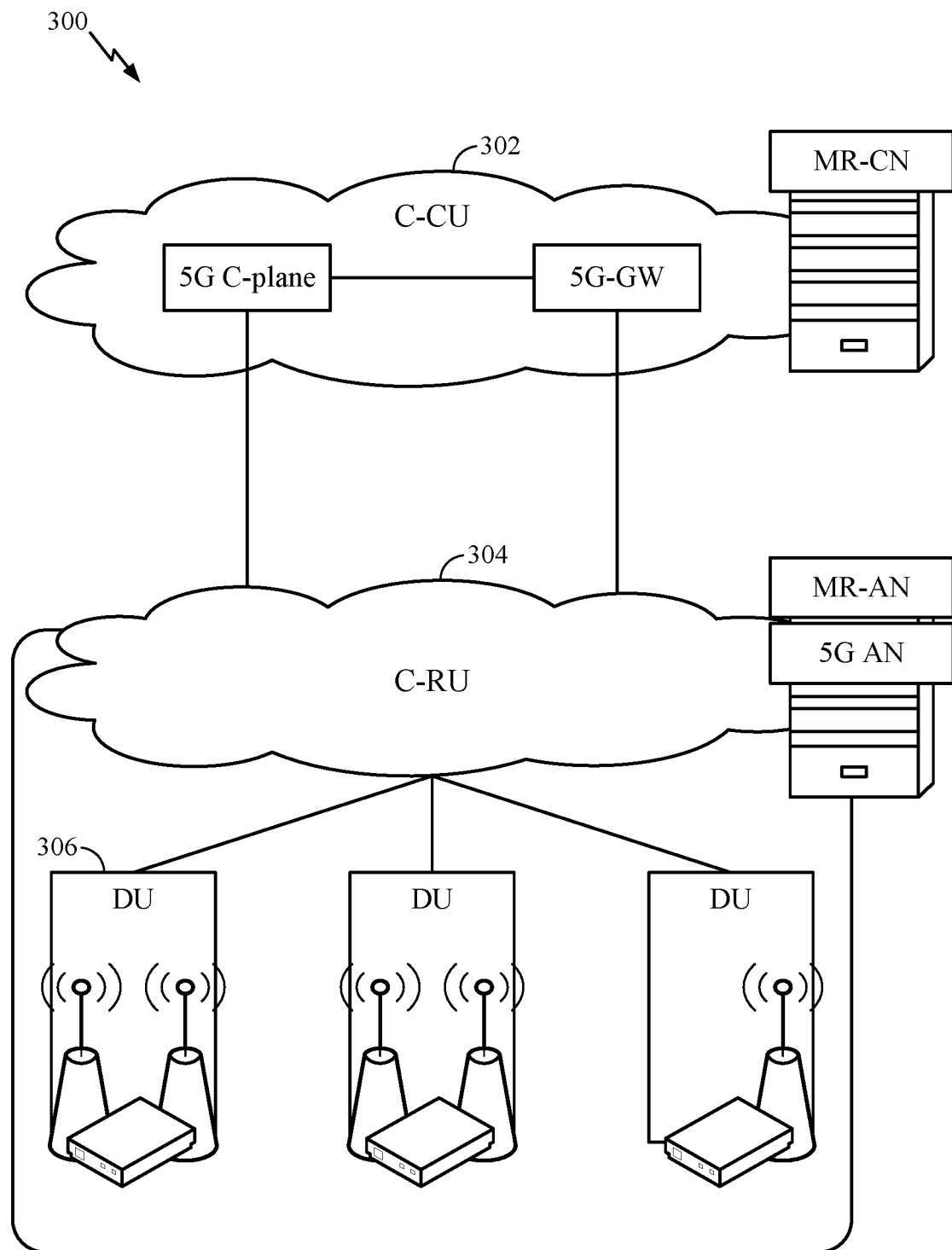
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
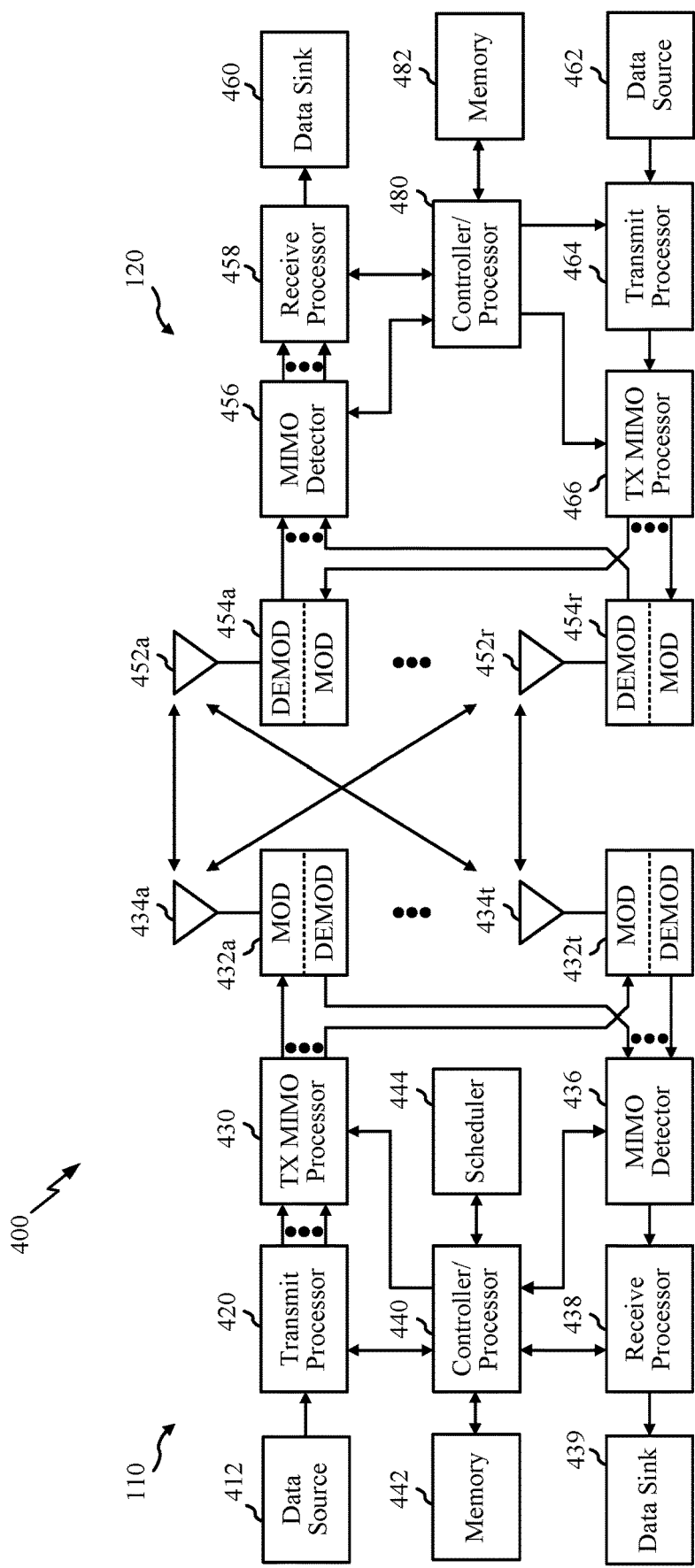
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The memories 442 and 482 may store data and program codes for the BS 110 and the UE 120, respectively. A scheduler 444 may schedule UEs for data transmission on the downlink and/or uplink.

Figure 5:
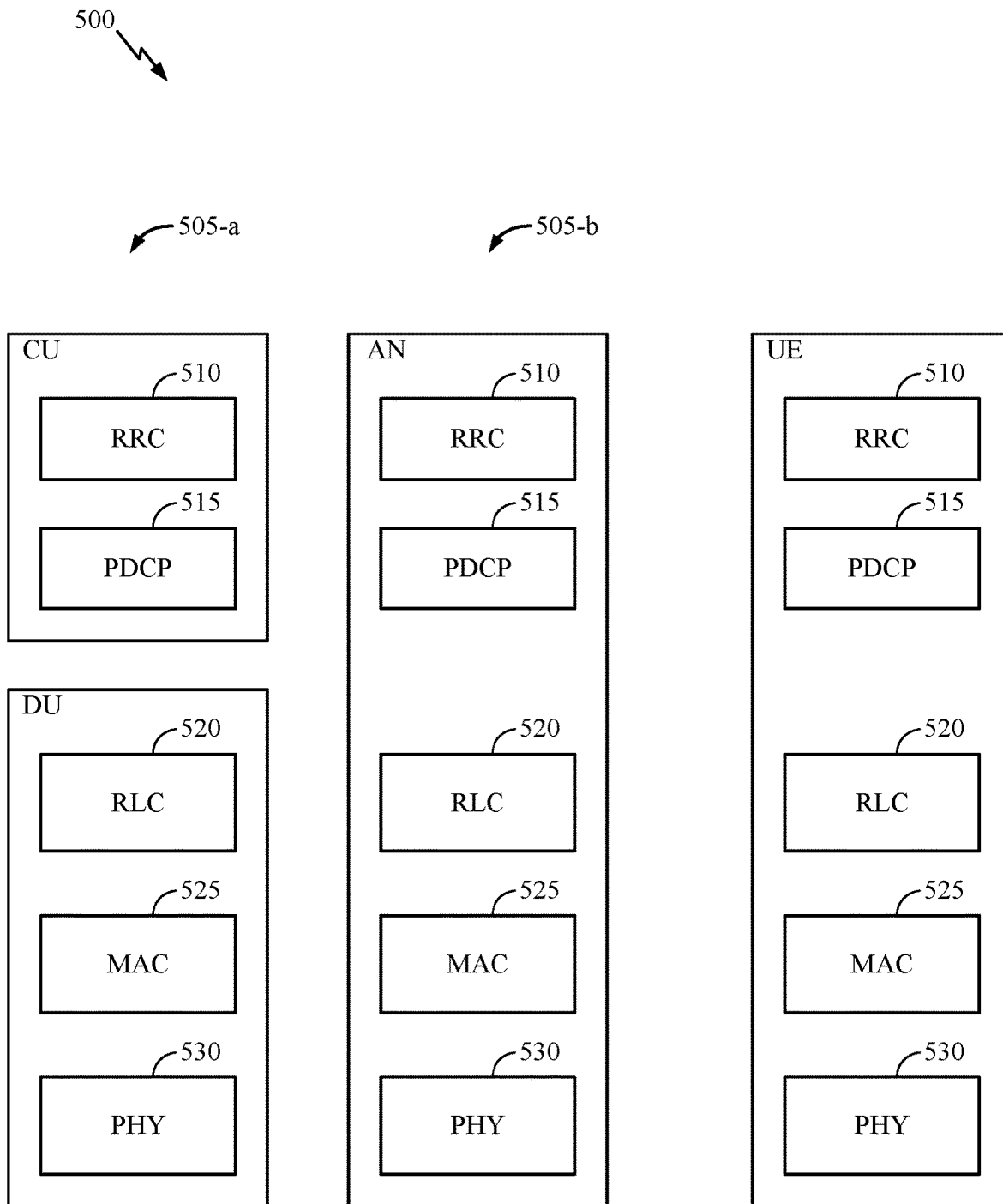
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., one of TRPs 208 in FIG. 2, which may be implemented as a DU). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
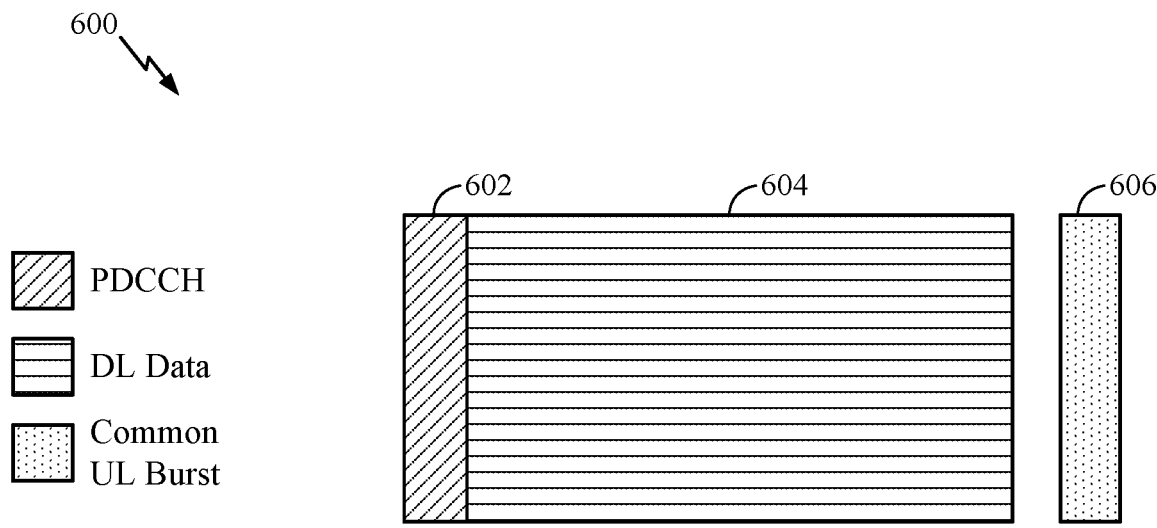
FIG. 6 illustrates an example of a downlink (DL)-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
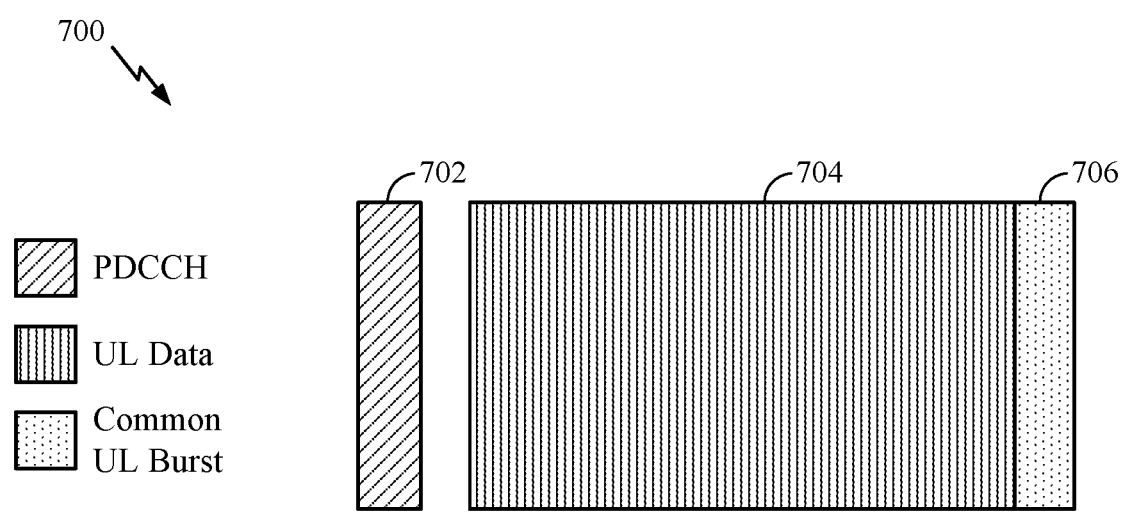
FIG. 7 illustrates an example of an uplink (UL)-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

LTE vehicle-to-everything (LTE-V2X) has been developed as a technology to address vehicular wireless communications to enhance road safety and the driving experience.

Figure 9:
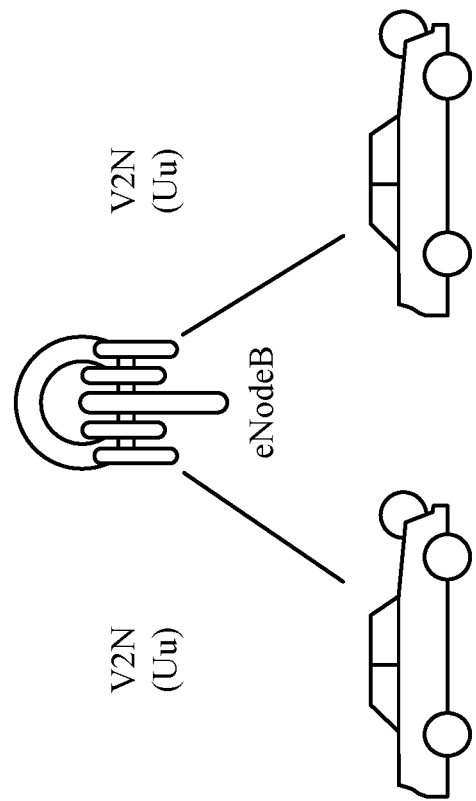
FIGS. 8 and 9 illustrate vehicle to everything (V2X) communication systems, in accordance with certain aspects of the present disclosure.
Figure 8:
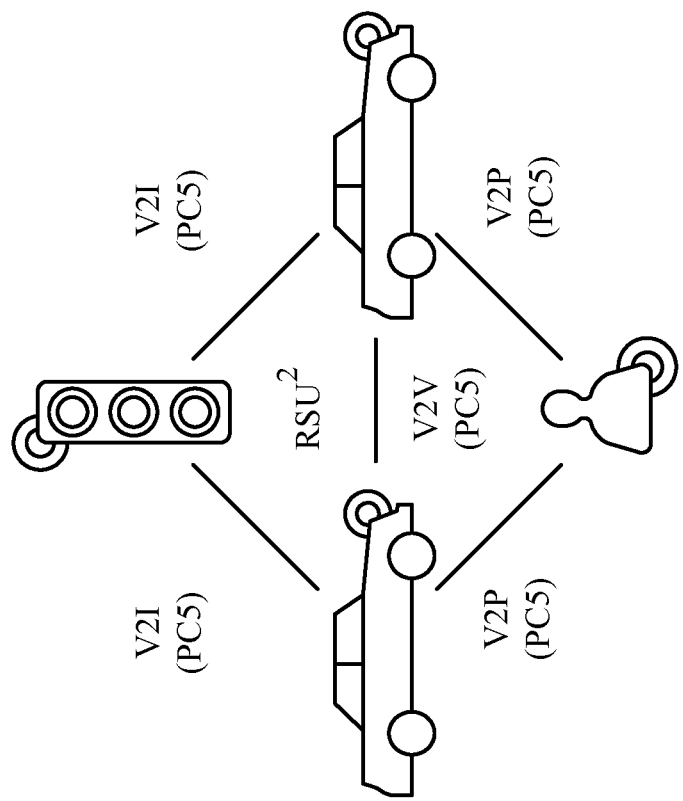

Referring to FIG. 8, a V2X system is illustrated with two vehicles. The V2X system, provided in FIGS. 8 and 9 provides two complementary transmission modes. A first transmission mode involves direct communications between participants in the local area. Such communications are illustrated in FIG. 8. A second transmission mode involves network communications through a network as illustrated in FIG. 9.

Referring to FIG. 8, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

The V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services described above.

Referring to FIG. 9, a second of two complementary transmission modes is illustrated. In the illustrated embodiment, a vehicle may communicate to another vehicle through network communications. These network communications may occur through discrete nodes, such as eNodeB (or gNodeB), that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Techniques for Predictive Quality of Service (QOS)

PC5 interface based vehicle-to-everything (V2X) communications are normally local to vehicles in proximity to each other. Moreover, quality of service (QoS) control or congestion handling is relatively passive. For example, QoS control may be based on measured channel busy ratio (CBR), or based on received V2X messages. There are several issues with such a mechanism. For example, it may take time for a user-equipment (UE) (e.g., a vehicle) to detect congestion for V2X communication. Therefore, there may be delay before the UE can scale back V2X communication due to detection of the congestion, resulting in degradation of the overall V2X operation (e.g. cause packet loss).

In addition, the UE may not apply congestion control until after several evaluation periods (e.g., to avoid ping-pong effects) which may cause unnecessary degradation of service level. For example, congestion control operations may be applied to vehicles that have already left the congested area. On the other hand, overly frequent evaluation may waste power and cause instability to the system. Certain aspects of the present disclosure provide a centralized approach for predictive QoS control mechanism for V2X communication to address these issues.

Figure 10:
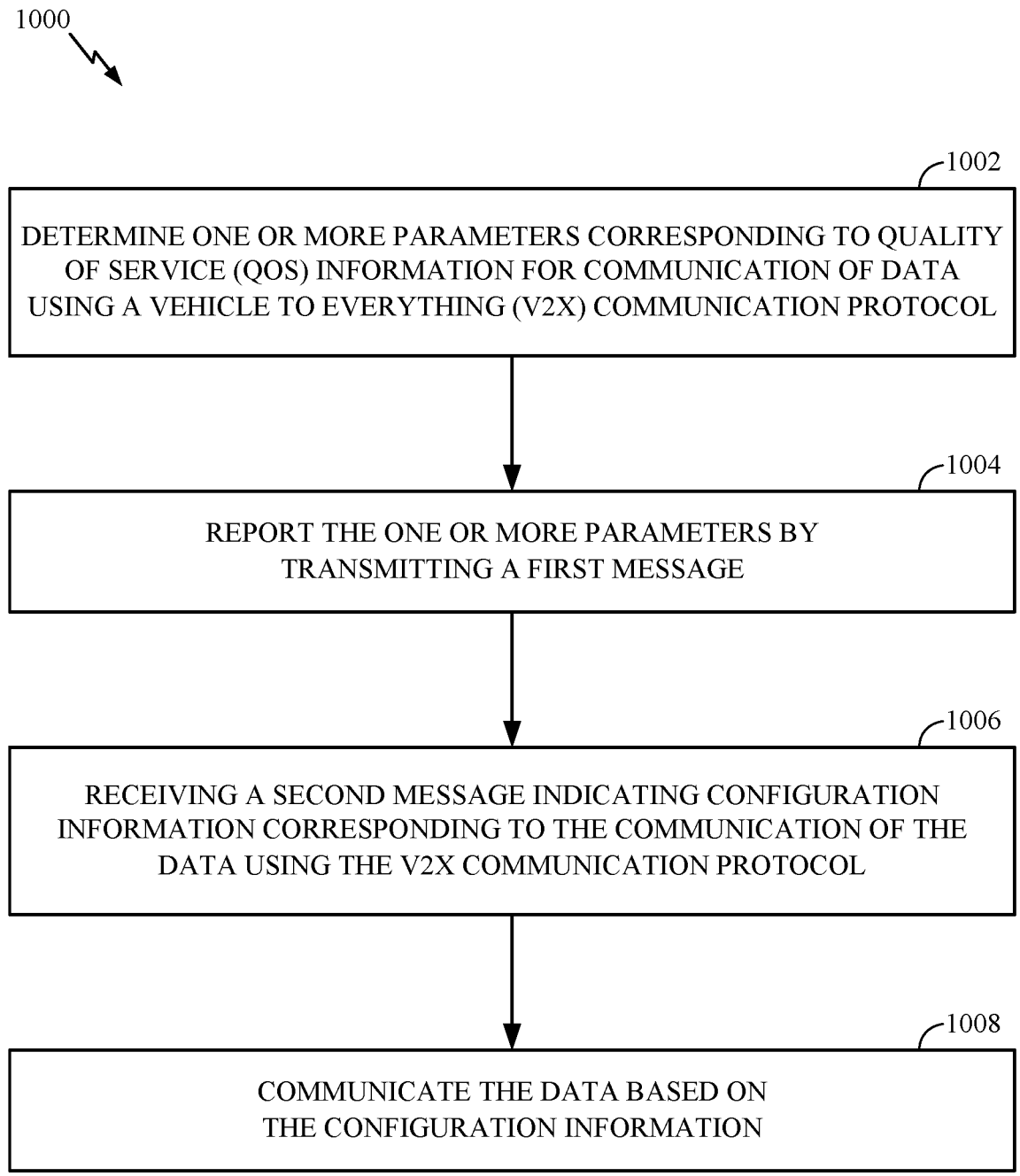
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., a vehicle).

The operations 1000 begin, at block 1002, by determining one or more parameters corresponding to QoS information for communication of data using a V2X communication protocol, and at block 1004, by reporting the one or more parameters by transmitting a first message. At block 1006, the operations 1000 continue by receiving a second message indicating configuration information corresponding to the communication of the data using the V2X communication protocol, and at block 1008, by communication the data based on the configuration information. In certain aspects, the reception of the second message comprises receiving the second message indicating the configuration information determined (e.g., by a QoS manager) based on the one or more parameters.

Figure 11:
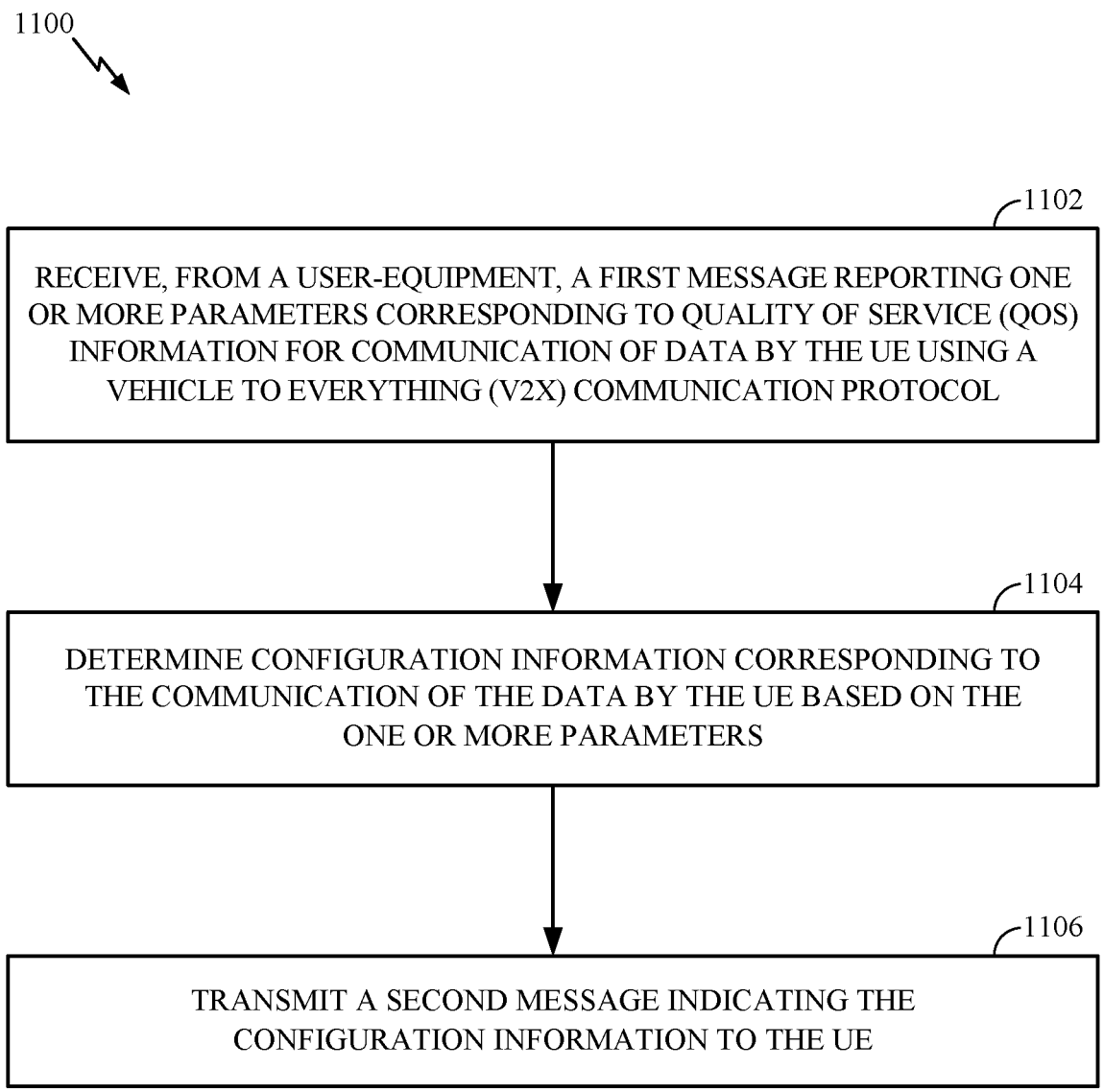
FIG. 11 is a flow diagram illustrating example operations for wireless communication by a quality of service (QoS) manager, in accordance with certain aspects of the present disclosure.

FIG. 11 is a flow diagram illustrating example operations 1100 for wireless communication, in accordance with certain aspects of the present disclosure. The operations 1100 may be performed, for example, by a QoS manager (e.g., a central server).

The operations 1100 begin, at block 1102, by receiving, from at least one UE (e.g., a vehicle), a first message reporting one or more parameters corresponding to QoS information for communication of data by the UE using a V2X communication protocol, and at block 1104, by determining configuration information corresponding to the communication of the data by the UE based on the one or more parameters. At block 1106, the operations continue by transmitting a second message indicating the configuration information.

Figure 12:
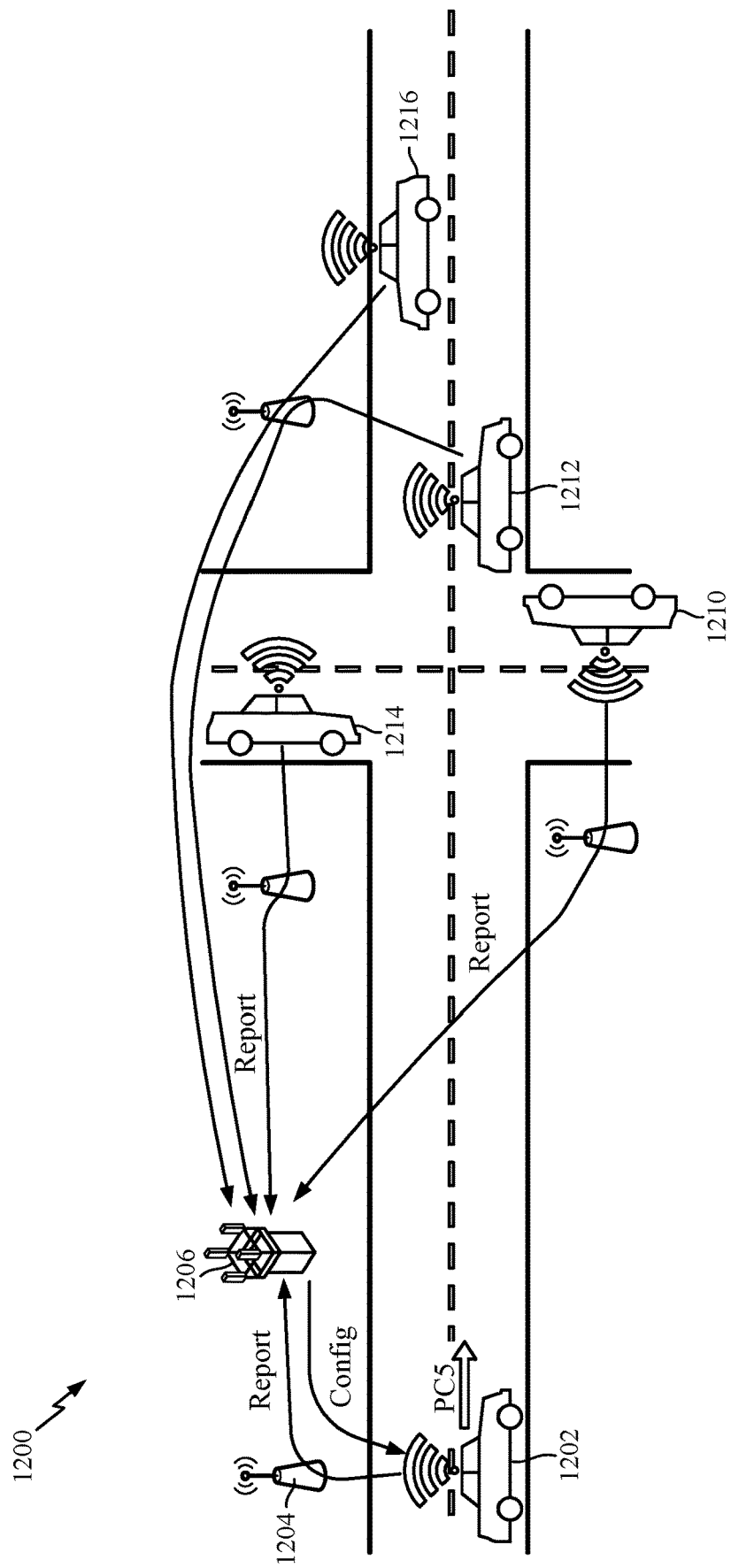
FIG. 12 illustrates a centralized predictive QoS system, in accordance with certain aspects of the present disclosure.

FIG. 12 illustrates a centralized predictive QoS system 1200, in accordance with certain aspects of the present disclosure. As illustrated, multiple UEs 1202, 1210, 1212, 1214, 1216 (e.g., vehicles) report QoS related information to a QoS manager 1206 (e.g., a centralized server). For example, the UE 1202 may report through a node 1204 (e.g., a base station) one or more parameters related to QoS for communication of V2X data. The QoS information may include one or more of the QoS requirements of the UE, the applications running on the UE (e.g., in the form of a provider service identifier (PSID)), the observed QoS level of the UE, trajectory, or path plan. The UE may also report a time period and a location at which one or more of the parameters are applicable. For example, the UE may indicate a time and location at which the QoS level of the UE was observed for a specific application.

The QoS manager may apply analytics and predict the proper QoS handling for the UE 1202 based on the one or more parameters related to QoS reported by the UE 1202 and/or other UEs (e.g., vehicles) as shown in FIG. 12. The UE may then receive and follow instructions from the QoS manager 1206 regarding QoS handling. For example, the UE may be indicated a QoS level to use during a certain time period (e.g., the next 5 minutes) when approaching an intersection, as illustrated in FIG. 12, to communicate via, for example, a PC5 communication interface.

In certain aspects, the UE may be configured to perform the reporting of the QoS information. For example, the UE may be indicated a configuration of the reporting via a user-plane or a control plane. For example, the configuration may be communicated via the user-plane with data network name (DNN) information, the server's internet protocol (IP) address, transport protocol to use, and port number(s). If the configuration is communicated via the control plane, the configuration may be communicated over non-access stratum (NAS) with an identifier (ID) pointing to the QoS manager for the NAS message transport or security information for the use of the NAS message transport. The configuration of the reporting may also indicate the frequency of the reporting, a trigger event or threshold to begin the reporting process, the format of the QoS information to be reported, or whether to report additional information such as a trajectory or path plan of the UE.

As presented above, once the UEs have reported the QoS information, the UE may be indicated, by the QoS manager 1206, the configuration to use for the communication over the PC5 interface. For example, the configuration may include the ProSe per packet priority (PPPP) mapping, the fifth generation (5G) QoS indicator (5QI), or other parameters, as well as location and timing information to indicate when and where to use configuration for communication over the PC5 interface, as will be described in more detail herein.

The indication of the configuration for the communication over the PC5 interface may be sent over the user-plane or the control-plane. When the configuration is communicated over the user-plane, the UE may be configured to establish and maintain a protocol data unit (PDU) session or packet data network (PDN) connection in order to receive the configuration (e.g. using open mobile alliance (OMA) device management (DM)). When the configuration is communicated over the control-plane, the configuration may be sent over NAS. For example, the QoS manager may use the UE policy framework such that the QoS may send the configuration to the UE via the policy control function (PCF). The PCF may send the configuration to the access and mobility function (AMF), and the AMF may use the NAS signaling to communicate the configuration to the UE. Alternatively, the QoS manager may communicate with the AMF directly and send the configuration to the AMF, which in turn sends the configuration to the UE via the NAS signaling.

As presented above, the UE may report information to the QoS manager 1206 for the QoS manager 1206 to determine the configuration for the communication over the PC5 interface. The reported information may include the current QoS requirements such as the QoS level to be used based on active applications at the UE and the traffic pattern of the UE (e.g., vehicle). The reported information may also include the observed load in the radio environment such as a channel busy ratio (CBR) and time and location corresponding to the CBR.

Other information that may be reported may include the amount of load in the geographical environment observed by the UE. For example, the UE may report information based on messages received by the UE from other UEs (vehicles). For instance, the UE 1202 may report the number of other vehicles travelling in the same direction as the UE 1202. The UE 1202 may also report other enhancements such as the path plan of the UE 1202, as well as the speed and direction of travel of the UE 1202.

The communication configuration sent to the UE from the QoS manager 1206 may include the PSID to PPPP or ProSe Per Packet Reliability (PPPR) mapping, transmission features such as whether to use transmit diversity and/or carrier aggregation, or a modulation and coding scheme (MCS) to use such as quadrature amplitude modulation (QAM), with specific location and time corresponding to the configuration. The communication configuration indicated to the UE may also include a number of retransmission attempts to be used, a recommended message rate, or packet delay bound deemed achievable. In certain aspects, the PPPP and/or PPPR may be replaced with the 5G QoS ID (5QI).

FIG. 13A is a table 1300 indicating example parameters to be reported by a UE (e.g., UE 1202), in accordance with certain aspects of the present disclosure. As illustrated, the UE may report one or more PSIDs. A PSID is an identifier associated with a service (e.g., an application) used by the UE. Thus, the UE may indicate a corresponding PPPP and/or PPPR (or 5QI) associated with the one or more PSIDs, as well as a transmit characteristics (e.g., a MCS, whether transmit diversity is used, and/or a number of retransmissions to be used), a buffer status, a traffic pattern, or a message generation rate. In certain aspects, the UE may also indicate a location and time during which these parameters apply. As previously described, the parameters are communicated to the QoS manager 1206 in order for the QoS manager 1206 to determine (e.g., predict) a communication configuration to be used by the UE 1202, or other UEs at specific time intervals and locations, as described with respect to FIG. 13B.

FIG. 13B is a table 1302 illustrating example configurations for communication determined by the QoS manager 1206 and communicated to the UE 1202, in accordance with certain aspects of the present disclosure. As illustrated, the QoS manager 1206 may indicate a mapping of communication configuration parameters to one or more PSIDs. For example, for the QoS manager 1206 may indicate the mapping of the one or more PSIDs to a recommended maximum PPPP/PPPR (or 5QI) to be used, a transmit characteristic (e.g., MCS, whether transmit diversity is recommended, and/or a number of retransmissions recommended), and a recommended message rate to be used. As illustrated, the table 1302 may also include a location where the indicated configuration is valid, as well as a time during which the configuration is applicable. For example, the table 1302 may indicate a global navigation satellite system (GNSS) coordinate, as illustrated.

In certain aspects, the QoS manager may also determine a criteria for applying the configurations communicated to the UE. For example, the QoS manager may indicate two or more configurations, and a certain criteria to be applied by the UE to know when to use which of the configurations for communication. For example, the QoS manager 1206 may indicate to use a first configuration for communication if a number of vehicles in proximity to the UE is below a threshold, and to use a second configuration for communication if the number of vehicles in proximity to the UE is above a threshold. In certain aspects, the QoS manager 1206 may indicate to use a first configuration if the UE arrives at a location within a specific time window, and otherwise use a second configuration for communication.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising: receiving, by the UE, a first message indicating a configuration for reporting of quality of service (QoS) information, the configuration indicating how to report one or more parameters corresponding to the QoS information; reporting, by the UE, the one or more parameters by transmitting a second message, the one or more parameters being reported in accordance with the configuration, wherein the reporting of the one or more parameters comprises reporting the QoS information in accordance with the configuration; and receiving, by the UE, a third message indicating configuration information based on the one or more parameters for communication of data.

2. The method of claim 1, further comprising communicating, by the UE, the data based on the configuration information.

3. The method of claim 1, wherein the configuration for the reporting comprises at least one of:
   an indication of a frequency at which the one or more parameters are to be reported;
   an event that triggers the reporting of the one or more parameters; or
   a format for the reporting of the one or more parameters.

4. The method of claim 1, wherein at least one of the first message, the second message, or the third message is delivered as a user-plane message.

5. The method of claim 4, further comprising:
   establishing a protocol data unit (PDU) session, wherein the user-plane message is communicated after establishing the PDU session.

6. The method of claim 1, wherein at least one of the first message, the second message, or the third message is delivered as a control plane message.

7. The method of claim 6, wherein the control plane message is communicated via non-access stratum (NAS) signaling.

8. The method of claim 1, wherein the one or more parameters indicate at least one of:
   a current QoS requirement of the UE;
   a channel busy ratio (CBR), and a time and a location corresponding to the CBR;
   a number of vehicles travelling in the same direction as the UE;
   a path plan of the UE;
   speed of the UE; or
   a direction of travel of the UE.

9. The method of claim 1, wherein the configuration information for the communication indicates at least one of:
   a mapping of a provider service identifier (PSID) to a packet priority parameter or a packet reliability parameter;
   whether carrier aggregation is to be used for the communication;
   whether transmission diversity is to be used for the communication;
   a message rate to be used for the communication;
   a number of retransmission attempts to be used for the communication;
   a modulation and coding scheme to be used for the communication; or
   whether duplicate transmission is to be used for the communication.

10. The method of claim 1, wherein the third message comprises an indication of a location and a time for the configuration information to be applied for the communication of the data.

11. The method of claim 1, further comprising determining the configuration information based on the one or more parameters.

12. The method of claim 1, wherein the configuration information comprises: a first QoS configuration and a first criteria indicating whether to apply the first QoS configuration for the communication of the data.

13. The method of claim 12, wherein the configuration information further comprises: a second QoS configuration and a second criteria indicating whether to apply the second QoS configuration for the communication of the data, and wherein the first QoS configuration is different than the second QoS configuration.

14. A method for wireless communication, comprising: transmitting a first message indicating a configuration for reporting of quality of service (QoS) information, the configuration indicating how to report one or more parameters corresponding to the QoS information; receiving, from at least one user-equipment (UE), a second message reporting the one or more parameters corresponding to the QoS information for communication of data by the UE, the one or more parameters being reported in accordance with the configuration, wherein receiving the second message reporting of the one or more parameters includes receiving the second message reporting the QoS information in accordance with the configuration; and transmitting, to the UE, a third message indicating configuration information based on the one or more parameters for the communication of the data, the configuration information indicating at least one QoS configuration and whether to use the at least one QoS configuration for the communication of the data.

15. The method of claim 14, further comprising:
communicating the data with the UE based on the configuration information.

16. The method of claim 14, wherein the configuration for the reporting comprises at least one of:
an indication of a frequency at which the one or more parameters are to be reported by the UE;
an event that triggers the reporting of the one or more parameters by the UE; or
a format for the reporting of the one or more parameters by the UE.

17. The method of claim 14, wherein at least one of the first message, the second message, or the third message is delivered as a user-plane message.

18. The method of claim 17, wherein at least one of the first message, the second message, or the third message is delivered as a control plane message.

19. The method of claim 18, wherein the control plane message is communicated via non-access stratum (NAS) signaling.

20. The method of claim 14, wherein the one or more parameters indicate at least one of:
a current QoS requirement of the UE;
a channel busy ratio (CBR);
a number of vehicles travelling in the same direction as the UE;
a path plan of the UE;
speed of the UE; or
a direction of travel of the UE.

21. The method of claim 14, wherein the configuration information for the communication indicates at least one of:
a mapping of a provider service identifier (PSID) to a packet priority parameter or a packet reliability parameter, as well as a location and a time corresponding to the mapping;
whether carrier aggregation is to be used for the communication;
whether transmission diversity is to be used for the communication;
a message rate to be used for the communication;
a number of retransmission attempts to be used for the communication;
a modulation and coding scheme to be used for the communication; or
whether duplicate transmission is to be used for the communication.

22. The method of claim 14, wherein the third message comprises an indication of a location and a time for the configuration information to be applied for the communication of the data.

23. The method of claim 14, wherein the configuration information comprises: a first QoS configuration and a first criteria indicating whether to apply the first QoS configuration for the communication of the data.

24. The method of claim 23, wherein the configuration information further comprises: a second QoS configuration and a second criteria indicating whether to apply the second QoS configuration for the communication of the data, and wherein the first QoS configuration is different than the second QoS configuration.

25. An apparatus for wireless communication by a user-equipment (UE), comprising: at least one processor configured individually or collectively to determine one or more parameters corresponding to quality of service (QoS) information for communication of data; and a transceiver coupled to the at least one processor, the transceiver being configured to: receive, by the UE, a first message indicating a configuration for reporting of the QoS information, the configuration indicating how to report the one or more parameters corresponding to the QoS information; report, by the UE, the one or more parameters by transmitting a second message, the one or more parameters being reported in accordance with the configuration, wherein the transceiver is configured to report the one or more parameters by being configured to report the QoS information in accordance with the configuration; and receive, by the UE, a third message indicating configuration information based on the one or more parameters for the communication of the data, the configuration information indicating at least one QoS configuration and whether to use the at least one QoS configuration for the communication of the data.

26. The apparatus of claim 25, wherein the configuration for the reporting comprises at least one of:
an indication of a frequency at which the one or more parameters are to be reported;
an event that triggers the reporting of the one or more parameters; or
a format for the reporting of the one or more parameters.

27. The apparatus of claim 25, wherein at least one of the first message, the second message, or the third message is delivered as a user-plane message.

28. The apparatus of claim 27, wherein:
the at least one processor is further configured to establish a protocol data unit (PDU) session, wherein the user-plane message is communicated after establishing the PDU session.

29. The apparatus of claim 25, wherein at least one of the first message, the second message, or the third message is delivered as a control plane message.

30. An apparatus for wireless communication, comprising: a transceiver configured to: transmit a first message indicating a configuration for reporting of quality of service (QoS) information, the configuration indicating how to report one or more parameters corresponding to the QoS information; and receive, from at least one user-equipment (UE), a second message reporting the one or more parameters corresponding to the QoS information for communication of data by the UE, wherein the transceiver is configured to receive the second message reporting of the one or more parameters by being configured to receive the second message reporting the QoS information in accordance with the configuration; and at least one processor coupled to the transceiver, the at least one processor being configured individually or collectively to determine configuration information corresponding to the communication of the data by the UE based on the one or more parameters, wherein the transceiver is further configured to transmit, to the UE, a third message indicating the configuration information based on the one or more parameters for the communication of the data, the configuration information indicating at least one QoS configuration and whether to use the at least one QoS configuration for the communication of the data.

* * * * *